(No Model.)
G. ALLEN & J. SANDHOFER.
VEHICLE TONGUE SUPPORT.
No. 456,321. Patented July 21, 1891.
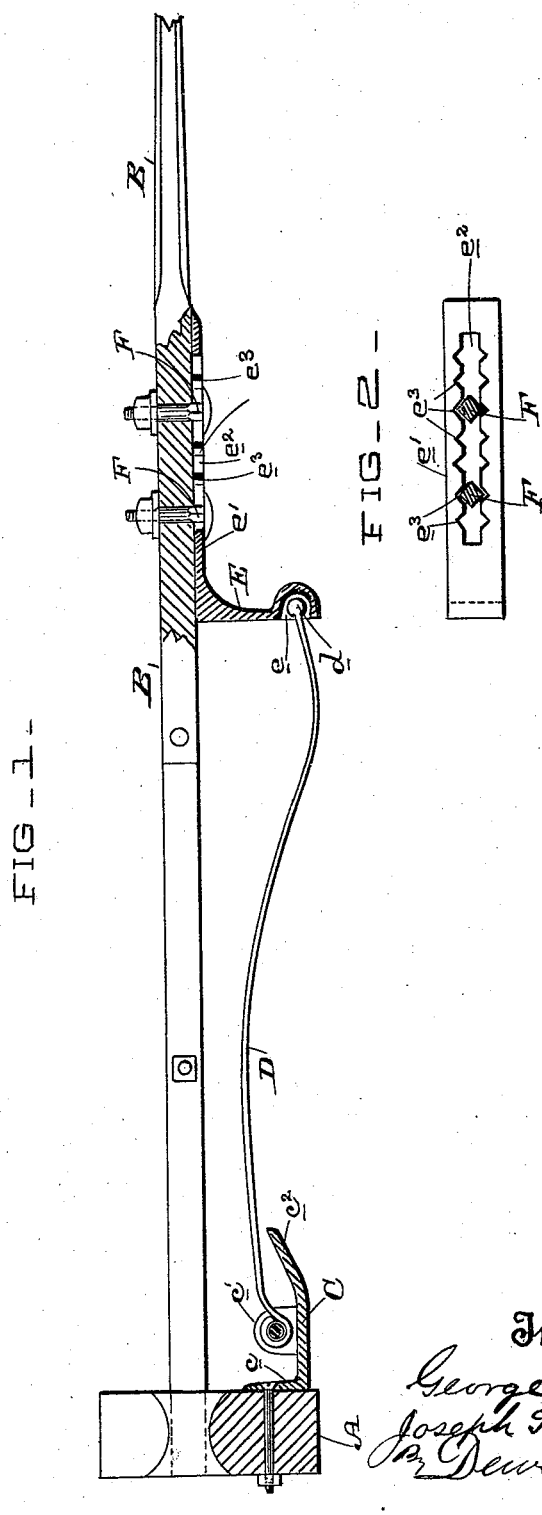

UNITED STATES PATENT OFFICE.

GEORGE ALLEN AND JOSEPH SANDHOFER, OF AUBURN, CALIFORNIA.

VEHICLE-TONGUE SUPPORT.

SPECIFICATION forming part of Letters Patent No. 456,321, dated July 21, 1891.

Application filed November 5, 1890. Serial No. 370,411. (No model.)

*To all whom it may concern:*

Be it known that we, GEORGE ALLEN and JOSEPH SANDHOFER, citizens of the United States, residing at Auburn, Placer county, State of California, have invented an Improvement in Vehicle-Pole Supports; and we hereby declare the following to be a full, clear, and exact description of the same.

Our invention relates to the class of supports the object of which is to hold up the tongue or pole of a vehicle.

Our invention consists in the novel construction and arrangement of parts hereinafter described, and specifically pointed out in the claims.

The object of our invention is to provide a simple and effective support of this kind adapted to be readily attached to and released from the pole and not liable to get out of order or be in the way.

Referring to the accompanying drawings for a more complete explanation of our invention, Figure 1 is a sectional side view of our support. Fig. 2 is a view showing the engagement of the square portion of the bolts with the notches $e^3$.

A is the axle of a vehicle, and B is the pole thereof, having the usual hounds and other connections with the axle.

C is a bearing-plate having a head $c$, by which it is securely bolted to the lower portion of the forward side of the axle directly under the pole. This plate has upwardly-extending ears $c'$, in which is pivoted the rear end of the supporting-spring D, and said plate C has a forwardly-projecting arm $c^2$, which lies directly under the rear end of the spring and acts as a limiting-stop therefor to prevent it from falling down when its forward end is released from its connection in front. Under the pole is secured adjustably a bracket E, in the lower portion or end of which is formed a socket $e$, into which the forward end of the supporting-spring D is freely and removably fitted, the end of said spring being rounded, as shown at $d$, to serve as a bearing. The shank $e'$ of the bracket is provided with an elongated slot $e^2$, having in each side a series of notches $e^3$. Through this elongated slot and through the pole pass the bolts F, the square head ends of which are adapted to fit in the notches of the slot, whereby said bolts are securely held. By loosening them and removing their square head ends from the notches the bracket may be adjusted on the pole forward or back to regulate the tension and position of the spring. It will be seen that on account of this connection and position of the spring it serves to support the pole by end pressure and will hold up said pole, at the same time permitting its necessary play while in use. When the spring is disconnected from the bracket by relieving it from the loose socket-joint described, the pole may be let down, but the arm $c^2$ of plate C bearing under the spring prevents it from dropping to the ground. The loose socket-joint at the forward end of the spring allows the perfect movement of the pole without interference, and also permits the free removal of the spring from the bracket when it is desired to let the pole down.

Having thus described our invention, what we claim as new, and desire to secure by Letters Patent, is—

1. A support for vehicle-poles, consisting of a bracket adjustably secured to the under side of the pole, a spring having its forward end fitted loosely to the bracket, and a bearing-plate secured to the axle, having its front end extended and inclined upwardly to form a support for the spring, said bracket also having the ears $c'$, between which the rear end of the spring is secured, substantially as herein described.

2. A support for vehicle-poles, consisting of a spring, a bearing-plate secured to the axle and in which the rear end of the spring is pivoted, a bracket secured under the pole, having a socket forming a loose socket-joint between the forward end of the spring and said bracket, whereby the two may be readily disconnected, and an arm extending forwardly and upwardly from the bearing-plate under the spring to support it when freed from the bracket, substantially as herein described.

3. A support for vehicle-poles, consisting of a spring, a plate on the axle, having ears between which the rear end of the spring is secured, a bracket secured to the under side of the pole, having its shank slotted and the walls of the slot formed with notches, and bolts having square heads fitting said notches and adjustably securing the plate, substantially as herein described.

4. A support for vehicle-poles, consisting of a spring, a bearing-plate secured to the axle and in which the rear end of the spring is pivoted, a limiting arm or stop extending from said plate under the spring, an adjustable bracket secured under the pole, and a socket in the lower end of the bracket, into which the forward end of the spring removably fits, substantially as herein described.

In witness whereof we have hereunto set our hands.

GEORGE ALLEN.
JOSEPH SANDHOFER.

Witnesses:
H. W. HART,
W. R. MONOSA.